No. 711,888. Patented Oct. 21, 1902.
I. F. WOOD.
HUB ATTACHING DEVICE.
(Application filed Aug. 6, 1902.)
(No Model.)
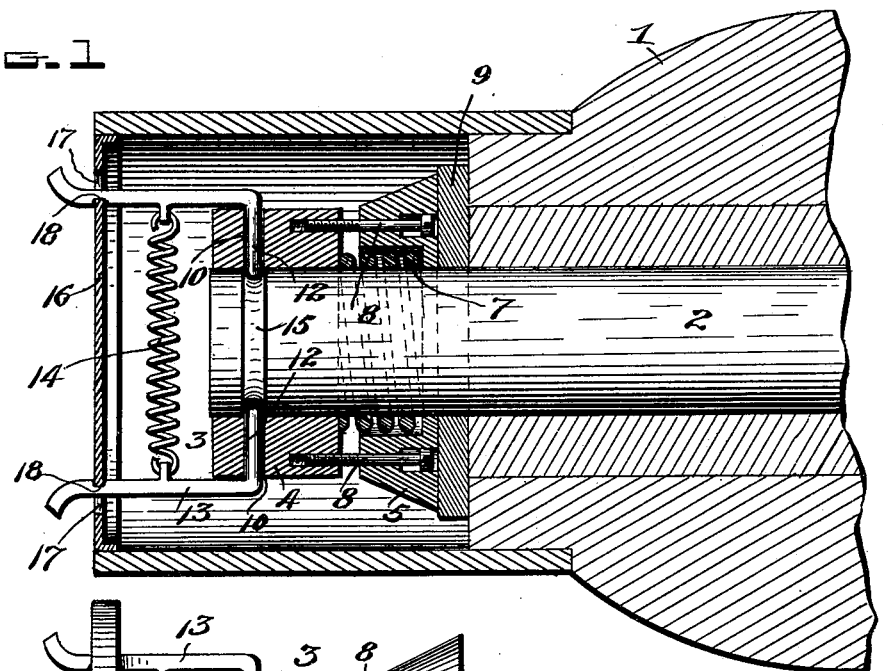
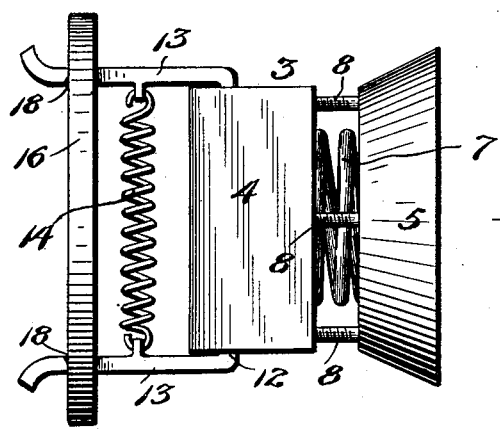
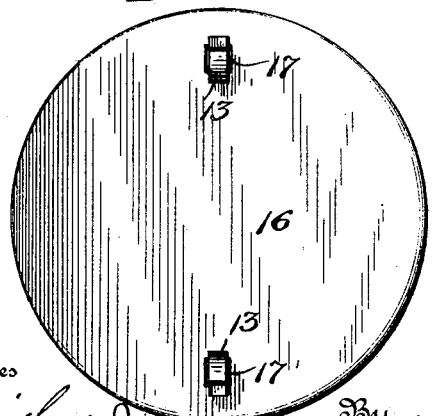
Inventor
I. F. Wood

UNITED STATES PATENT OFFICE.

IRA F. WOOD, OF GALVESTON, INDIANA.

HUB-ATTACHING DEVICE.

SPECIFICATION forming part of Letters Patent No. 711,888, dated October 21, 1902.

Application filed August 6, 1902. Serial No. 118,660. (No model.)

*To all whom it may concern:*

Be it known that I, IRA F. WOOD, a citizen of the United States, residing at Galveston, in the county of Cass and State of Indiana, have invented certain new and useful Improvements in Hub-Attaching Devices; and I do declare the following to be a full, clear, and exact description of the invention, such as will enable others skilled in the art to which it appertains to make and use the same.

This invention relates to hub-attaching devices, and has for its object to provide a device of this character by which the "tap" or nut may be quickly and securely applied to the axle of a vehicle and have connected therewith means for keeping dust and grit out of the end of the hub.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a vertical longitudinal section of a portion of a vehicle hub and axle, showing the application of the device thereto. Fig. 2 is a side view of the device detached. Fig. 3 is an end view of the dust-cap.

In the drawings, 1 denotes a hub, and 2 the axle or spindle, of a vehicle. 3 denotes the attaching device, which consists of a tap or nut 4, preferably rectangular in shape and having a smooth bore formed through the same for the reception of the end of the spindle 2. The inner end of the tap or nut 4 has loosely attached thereto a frusto-conical-shaped bearing-block 5, having a central bore corresponding to and in alinement with the bore of the nut 4.

In the face of the block 5, adjacent to the inner side of the nut, is formed a circular depression forming a seat for a coil-spring 7, which surrounds the axle-spindle at this point. One end of said spring bears against the end of the nut 4 and the other end against its seat in the block 5, the tension of the same being to force the nut and block apart. The movement of the block is limited by screws 8, passing through countersunk holes in the block 5 and being screwed into the end of the nut 4, the amount of play given the block being regulated by the distance the screws are driven into the nut.

The object of the block 5 is to continually force the washer 9 in the end of the hub up tight against the end of the box, thereby preventing lateral movement of the hub on the spindle, this construction taking up all wear on the washer until the same is entirely worn out.

The means for holding the nut on the spindle consists in providing the nut on two of its faces with alined holes or openings 10, which open into the bore of said nut and are adapted to receive the angularly-bent ends 12 of clamping-arms 13, which are connected together by a coiled spring 14 engaging short lugs formed on said arms. The ends 12 of the arms 13 pass through the openings 10 and engage an annular groove 15, formed on the axle-spindle 2, thereby holding the nut in place.

16 denotes a dust-cap in the shape of a circular disk, the edge of which is turned over to form an annular flange. This dust-cap is adapted to snugly fit within the end of the ferrule on the hub to keep out dust and dirt.

17 denotes slots formed in the disk 16, which are adapted to receive the outer ends of the spring-actuated clamping-arms 13, by which means the disk is held in place, the said arms being formed with notches 18, which engage with one of the walls of the slots 17 and prevent the disk from accidentally slipping off the ends of the arms, the extreme outer ends of said arms being turned outwardly to form gripping-handles for releasing the arms from engagement with the disk and nut.

From this description it will be seen that I have provided an attaching device for hubs which can be quickly put on and taken off and which will securely hold the hub in place, doing away with screw-threads and the necessity of a wrench. The device is adapted to turn with the wheel either forward or backward without liability of coming off.

While I have shown and described the device in connection with an axle-nut and axle, it is obvious that the same may be used on a nut and bolt, doing away with the threads on the same and providing the bolt with an annular groove and the nut with holes for the reception of the ends of the clamping-arms, as herein described.

From the foregoing description, taken in connection with the accompanying drawings, it is thought that the construction, operation, and advantages of my improved hub-attaching device will be readily apparent without requiring a more extended explanation.

Various changes in the form, proportion, and the minor details of construction may be resorted to without departing from the principle or sacrificing any of the advantages of this invention.

Having thus described the invention, what I claim as new, and desire to secure by Letters Patent, is—

1. In a device of the character described, the combination with an axle-spindle having an annular groove, and a hub; of a nut having a smooth bore and adapted to slip on said spindle, holes formed in said nut, spring-controlled clamping-arms having angularly-bent ends adapted to pass through said holes and engage said annular groove to hold said nut in place, and a spring-controlled bearing-block carried by said nut for taking up the wear upon the washer of said hub, substantially as specified.

2. In a device of the character described, the combination with an axle-spindle having an annular groove, and a hub; of a nut having a smooth bore and adapted to slip on said spindle, holes formed in said nut, spring-controlled clamping-arms having angularly-bent ends adapted to pass through said holes and engage said annular groove to hold said nut in place, and a spring-controlled bearing-block carried by said nut for taking up the wear upon the washer of said hub, and a dust cap or guard carried by said clamping-arms, substantially as and for the purpose set forth.

In testimony whereof I have hereunto set my hand in presence of two subscribing witnesses.

IRA F. WOOD.

Witnesses:
HARLEY H. MILLER,
CUSTIS WOOD.